(No Model.) 3 Sheets—Sheet 1.

J. H. WRIGHT.
CLUTCH OPERATING MECHANISM.

No. 312,059. Patented Feb. 10, 1885.

Witnesses
Wm A. Jones
A. B. Fairchild

Inventor
John H. Wright
By Atty
A. M. Wooster (No Model.) 3 Sheets—Sheet 2.

J. H. WRIGHT.
CLUTCH OPERATING MECHANISM.

No. 312,059. Patented Feb. 10, 1885.

Witnesses
Wm A Jones
A B Fairchild

Inventor:
John H. Wright
By atty
F H Wooster (No Model.) 3 Sheets—Sheet 3.

J. H. WRIGHT.
CLUTCH OPERATING MECHANISM.

No. 312,059. Patented Feb. 10, 1885.

Witnesses
Wm. H. Jones,
J. T. Wooster.

Inventor:
John H. Wright,
By J. T. Wooster
atty.

UNITED STATES PATENT OFFICE.

JOHN H. WRIGHT, OF BRIDGEPORT, CONNECTICUT.

CLUTCH-OPERATING MECHANISM.

SPECIFICATION forming part of Letters Patent No. 312,059, dated February 10, 1885.

Application filed March 1, 1884. (No model.)

*To all whom it may concern:*

Be it known that I, JOHN H. WRIGHT, a citizen of the United States, residing at Bridgeport, in the county of Fairfield and State of Connecticut, have invented certain new and useful Improvements in Clutch-Operating Mechanism for Metal-Working Machines; and I do hereby declare the following to be a full, clear, and exact description of the invention, such as will enable others skilled in the art to which it appertains to make and use the same.

My invention is applicable to any class of machines in which clutches are used, and has for its object to so simplify and improve the operating mechanism that but little power is required to operate the clutch, and its action is practically instantaneous in reversing the motion, while at the same time it may be so manipulated that no motion whatever is imparted to the table. I am thus enabled to run the machine directly from a main shaft, the interposition of a counter-shaft being unnecessary, and whether run from a main or counter shaft no shipping or other manipulation of the belts is required in stopping or starting the machine.

With these ends in view I have devised the novel construction which I will now describe, referring by letters to the accompanying drawings, forming part of this specification, in which—

Figure 1:
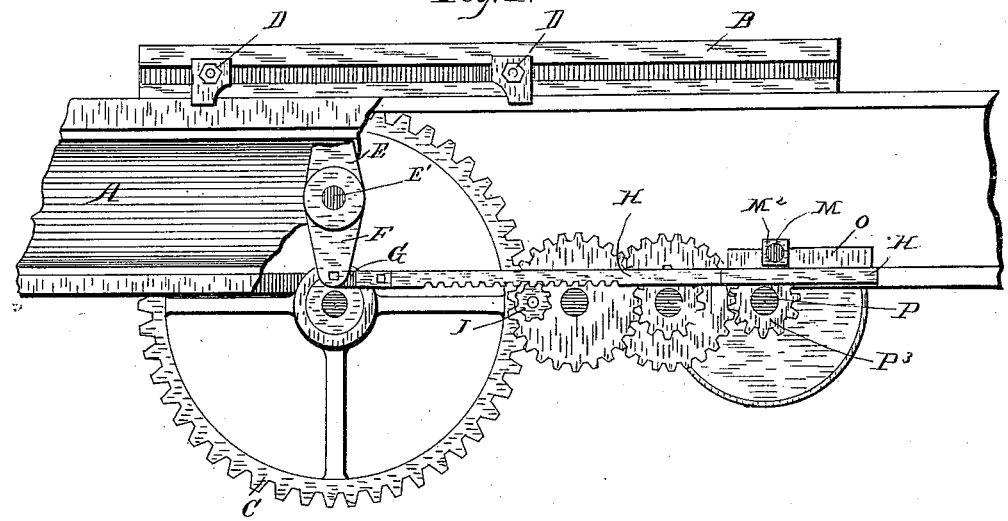
Figure 2:
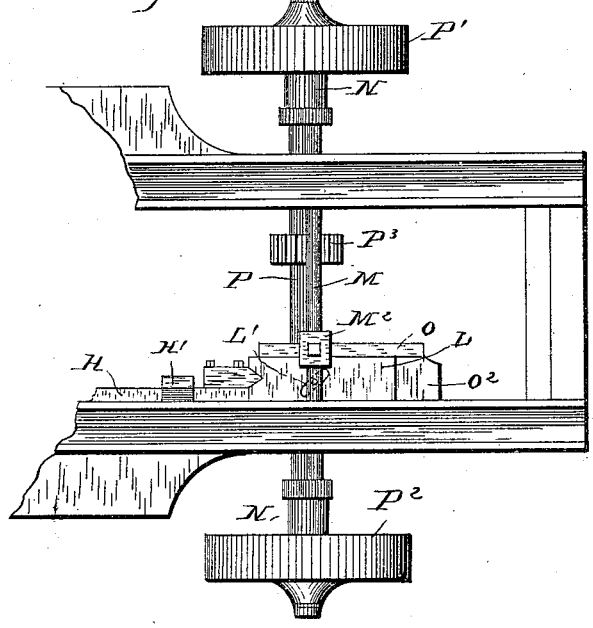
Figure 3:
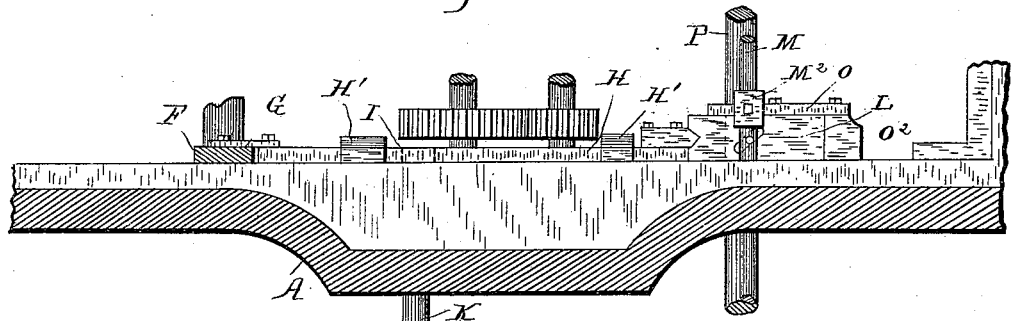
Figure 4:
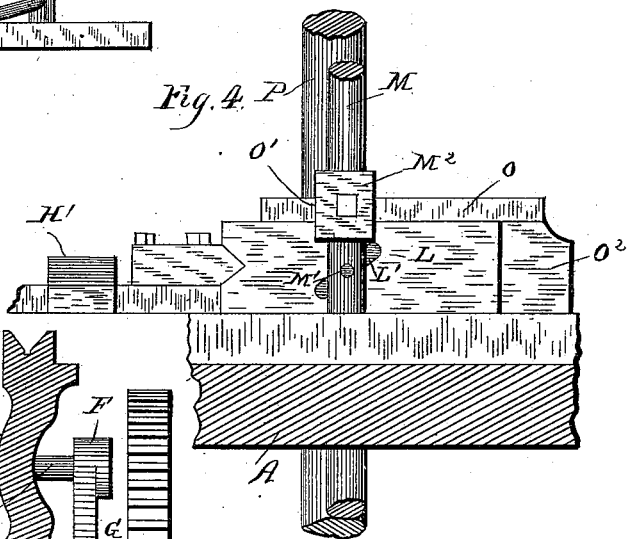
Figure 5:
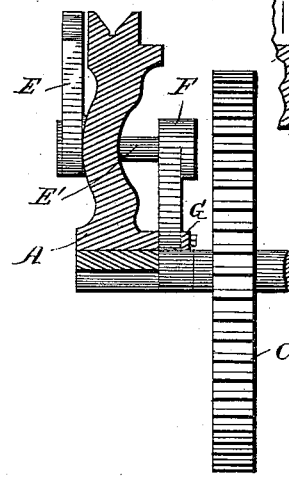
Figure 6:
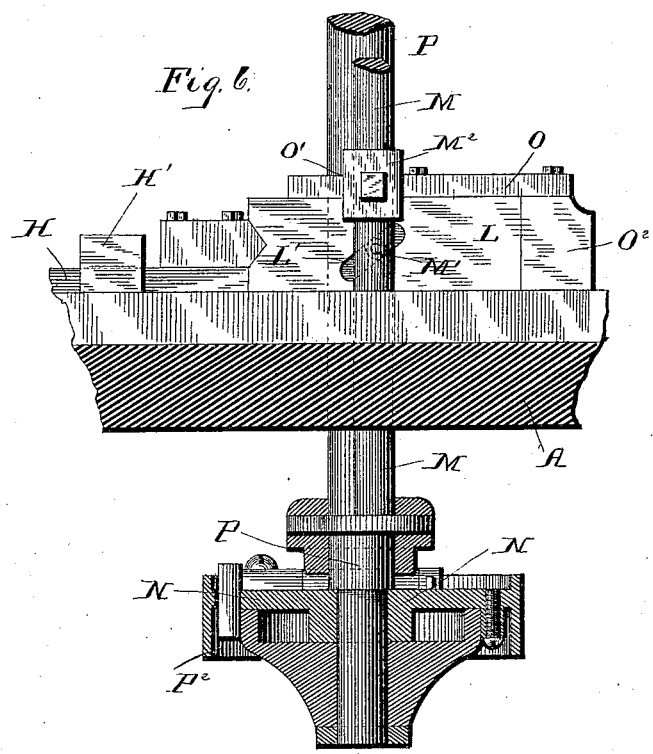

Figure 1 is a side elevation of a portion of a metal-planer, the bed being broken away to show the application of my improved mechanism. Fig. 2 is a plan view of one end of the bed, showing the driving-pulleys and clutch. Fig. 3 is a plan view of so much of the mechanism of a planer as is necessary to show the application of my improvement, the side of the bed being in horizontal section. Fig. 4 shows the connection with the clutch-rod upon an enlarged scale. Fig. 5 is a vertical section of one side of the bed with the shipping-levers and the operating-gear in elevation, and Fig. 6 is a plan view of a portion of one side of a machine with the bed and clutch in section.

Similar letters indicate like parts in all the figures.

A is the bed; B, the table sliding in ways, and C the operating-gear, which imparts motion to the table. Motion is imparted to this gear by means of a train of gearing intermediate between it and the driving-shaft. This train of gearing is of ordinary construction, and, being illustrated, is thought to require no further description. It will of course be understood that the pinion meshing with the operating-gear is concealed in the side elevation. These parts are all of ordinary construction.

D D are shipping-dogs, adjustably secured to the side of the table.

E' is a short shaft passing through the side of the bed. To the outer end of this shaft a lever, E, is secured, which projects upward and is engaged by the sliding dogs. To the inner end of shaft E' a downwardly-projecting lever, F, is secured. These levers project in diametrically-opposite directions, and are termed "shipping-levers." To the lower end of lever F a link, G, is pivoted, which in turn is pivoted to a rack, H, which is carried by supports H' upon the inner side of the bed.

K is a shaft passing through the bed, the outer end of which is provided with an operating-handle, K'. At the inner end of this shaft is a pinion, I, which meshes with rack H for a purpose to be more fully explained. P is the driving-shaft, which carries belt-pulleys P' P² and the first driving-pinion P³.

M is the sliding clutch-rod, and N N are the clutches. These may be of any ordinary construction; but I preferably use those which form the subject of my Letters Patent No. 288,291, dated November 13, 1883. The clutch-rod is provided on its upper side with a block, M², bolted securely thereto. This block slides in a recess, O', in a plate, O, which is secured in any suitable manner to the bed. This block acts to keep the rod from turning, as will be more fully explained. Projecting downward from the clutch-rod is a pin, M', which is preferably provided at its lower end with an anti-friction roller (not shown) engaging in a diagonal slot or groove, L', in a plate, L. This plate is arranged to slide freely in a box, O², between plate O and the bed of the machine. The sliding plate is securely bolted to rack H, and any movements of the rack are communicated by means of the diagonal slot in said plate and pin M' to the clutch-rod.

The operation is as follows: The sliding dogs upon the side of the table are adjusted in accordance with the throw which it is desired to give to the table. At the instant that the table reaches either extreme of its throw one of the shipping-dogs will strike the upper end of the outer shipping-lever. As both of the shipping-levers are rigidly secured to shaft E', any movement of the outer lever is communicated by means of the inner lever, the link, and the rack, to the sliding plate. As pin M' upon the clutch-rod engages in the diagonal slot in the sliding plate, it will be readily understood that the clutch-rod is moved transversely to the sliding plate at the instant either of the shipping-dogs strikes the outer shipping-lever. As block M² prevents the clutch-rod from turning in the slightest, it follows that positive action of one of the clutches must take place each time pin M' passes the center of the diagonal slot. The belt-pulleys P' P² both run loosely on shaft P, and belts from both run to either the main or counter shaft, one of the belts being crossed, so that the pulleys revolve in opposite directions.

In Fig. 4 pin M' is shown as in the center of the diagonal slot, in which position both clutches are released, and no motion can be imparted to the table, both pulleys being free to rotate on the shaft. This position of the parts may be readily brought about at any time by manipulation of shaft K, which carries pinion I, meshing with the rack. At any point in the reciprocation of the table its movement may be instantly stopped by placing the hand on handle K' and rotating pinion I in whichever direction may be necessary to bring pin M' into the center of slot L'. In this position the clutch which has been in engagement is released, and stoppage is instantaneous, as it is in no way dependent upon the position of the tool-holder or the table. In stopping or starting no shipping, unshipping, or other manipulation of the belts is required. Suppose the parts to be in the position shown in Fig. 2, and pulley P' to be rotating from left to right and pulley P² to be rotating from right to left. If it were now desired to move the table to the right, handle K' would be lifted up, which would give a partial rotation toward the right to pinion I, which in turn would move the rack and sliding plate to the right, and by means of pin M' in the diagonal slot would move the clutch-rod toward pulley P², thus engaging the clutch on that side of the machine, and causing the driving-shaft and driving-pinion P³ to rotate from right to left. By tracing out the movement of the train of gearing it will be seen that if pinion P³ rotates from right to left the operating-gear C will rotate from left to right, and vice versa. The parts being in the same position, if it were desired to move the table toward the left, handle K' would be pressed down. This would move the sliding plate toward the left, thus carrying the clutch-rod toward pulley P', and instantly engaging the clutch on that side of the machine. It will of course be apparent to any person skilled in the art that by dispensing with the feature of stopping the machine by placing the pin in the middle of the diagonal slot said slot may be materially shortened and the clutch mechanism adjusted more closely, thus enabling me to shorten the throw of the table. This arrangement, however, would necessitate the use of a counter-shaft and belt-shipping mechanism.

I do not desire to limit myself to the exact construction shown, as it is evident that the details may be varied within reasonable limits without departing from the spirit of my invention.

Having thus described my invention, I claim—

1. The clutches and the sliding clutch-rod having a pin, as shown, in combination with a sliding plate having a diagonal slot with which said pin engages, and means—for example, the shipping-lever and rack—for reciprocating said plate, so that when the pin is at either end of the slot one of the clutches will be engaged, and when in the middle of the slot both will be disengaged.

2. In a metal-working machine, the sliding-clutch-rod having pin M' and block M², in combination with the sliding plate having diagonal slot, and plate O, having recess O', in which the block slides, as described, and for the purpose set forth.

3. The adjustable shipping-dogs and shipping-levers E and F upon shaft E', in combination with the sliding plate, and clutch-rod, and the connecting mechanism, substantially as described.

4. The shipping-dogs and shipping-levers pivoted in the bed, in combination with the link, the rack, the sliding plate, and the clutch-rod, substantially as described.

5. The clutch-rod, the sliding plate, and the rack, in combination with the shipping-lever for automatically actuating the rack, and independent means—for example, a pinion—for actuating it by hand.

6. The clutch-rod having pin M', the sliding plate having groove L', and the rack, in combination with pinion I on shaft K, and handle for operating said shaft and pinion, as described, and for the purpose set forth.

7. The clutches, the clutch-rod having pin M', and the sliding plate having slot L', in combination with the rack, pinion I, and the operating-handle, substantially as described.

8. The shaft having a driving-gear and loose belt-pulleys on opposite sides of the bed, which are adapted to rotate in opposite directions, the clutches adapted to engage therewith, and clutch-rod having a pin, in combination with means—as the plate with diagonal slot, and rack and pinion—for causing either clutch to engage its pulley or disengaging both clutches, whereby the machine may be stopped, started, or reversed without manipulation of the belts.

9. In a metal-planer, the combination, with a shaft having a driving-gear and loose belt-pulleys at opposite ends thereof adapted to rotate in opposite directions, of independent clutches upon said shaft outside the bed which are adapted to engage said pulleys, and a device—for example, rod M—connected to said clutches whereby they may be alternately engaged and disengaged without manipulation of the belts.

In testimony whereof I affix my signature in presence of two witnesses.

JOHN H. WRIGHT.

Witnesses:
A. M. WOOSTER,
WM. A. JONES.